(12) United States Patent
Hildeman et al.

(10) Patent No.: US 12,478,607 B2
(45) Date of Patent: Nov. 25, 2025

(54) COMPOUNDS USEFUL FOR INHIBITING BFL1 AND THEIR USE IN THERAPY

(71) Applicant: CHILDREN'S HOSPITAL MEDICAL CENTER, Cincinnati, OH (US)

(72) Inventors: David A. Hildeman, Cincinnati, OH (US); Andrew Herr, Cincinnati, OH (US); Suhas G. Kallapur, Cincinnati, OH (US); Jarek Meller, Cincinnati, OH (US); Alexander Thorman, Cincinnati, OH (US)

(73) Assignee: Children's Hospital Medical Center, Cincinnati, OH (US)

( * ) Notice: Subject to any disclaimer, the term of this patent is extended or adjusted under 35 U.S.C. 154(b) by 0 days.

(21) Appl. No.: 17/597,515

(22) PCT Filed: Jul. 9, 2020

(86) PCT No.: PCT/US2020/070249
§ 371 (c)(1),
(2) Date: Jan. 10, 2022

(87) PCT Pub. No.: WO2021/007593
PCT Pub. Date: Jan. 14, 2021

(65) Prior Publication Data
US 2022/0249437 A1  Aug. 11, 2022

Related U.S. Application Data

(60) Provisional application No. 62/872,822, filed on Jul. 11, 2019.

(51) Int. Cl.
| A61K 31/382 | (2006.01) |
| A61K 31/353 | (2006.01) |
| A61K 47/69 | (2017.01) |
| A61P 31/04 | (2006.01) |
| A61P 35/00 | (2006.01) |

(52) U.S. Cl.
CPC .......... *A61K 31/382* (2013.01); *A61K 31/353* (2013.01); *A61K 47/6913* (2017.08)

(58) Field of Classification Search
None
See application file for complete search history.

(56) References Cited

U.S. PATENT DOCUMENTS

| 6,465,187 B1 | 10/2002 | Nilsson et al. |
| 8,394,382 B2 | 3/2013 | Crocker et al. |
| 8,524,762 B2 | 9/2013 | Nawrocki et al. |
| 9,078,823 B2 | 7/2015 | Gunderson et al. |
| 11,541,073 B2 | 1/2023 | Hildeman |
| 2003/0199489 A1 | 10/2003 | Wang |
| 2007/0021448 A1 | 1/2007 | Han et al. |
| 2009/0118135 A1 | 5/2009 | Reed et al. |
| 2015/0051249 A1 | 2/2015 | Walensky |
| 2015/0099796 A1 | 4/2015 | Gunderson et al. |
| 2016/0166582 A1 | 6/2016 | Lavelin et al. |
| 2016/0303101 A1 | 10/2016 | Warner et al. |
| 2018/0265524 A1 | 9/2018 | Walensky et al. |
| 2019/0216916 A1 | 7/2019 | Hildeman et al. |
| 2022/0249437 A1 | 8/2022 | Hildeman |

FOREIGN PATENT DOCUMENTS

| WO | 2006108241 A1 | 10/2006 |
| WO | 2008157003 A2 | 12/2008 |
| WO | 2012010633 A1 | 1/2012 |
| WO | 2016079067 A1 | 5/2016 |
| WO | 2017007858 A1 | 1/2017 |
| WO | 2019140370 A1 | 7/2019 |
| WO | 2019140372 A2 | 7/2019 |
| WO | 2021007593 A1 | 1/2021 |

OTHER PUBLICATIONS

Chong CR, Xu J, Lu J, Bhat S, Sullivan Jr DJ, Liu Jo. Inhibition of angiogenesis by the antifungal drug itraconazole. ACS chemical biology. Apr. 13, 2007;2(4):263-70. (Year: 2007).*
Del Rowe, John D., et al. "Accelerated regression of brain metastases in patients receiving whole brain radiation and the topoisomerase II inhibitor, lucanthone." International Journal of Radiation Oncology* Biology* Physics 43.1 (1999): 89-93. (Year: 1999).*
Cruz-Muñoz W, Jaramillo ML, Man S, Xu P, Banville M, Collins C, Nantel A, Francia G, Morgan SS, Cranmer LD, O'Connor-McCourt MD. Roles for endothelin receptor B and BCL2A1 in spontaneous CNS metastasis of melanoma. Cancer research. Oct. 1, 2012;72(19):4909-19. (Year: 2012).*
Hind CK, Carter MJ, Harris CL, Chan HT, James S, Cragg MS. Role of the pro-survival molecule Bfl-1 in melanoma. The International Journal of Biochemistry & Cell Biology. Feb. 1, 2015;59:94-102. (Year: 2015).*
Mahadevan, Daruka, et al. "Transcript profiling in peripheral T-cell lymphoma, not otherwise specified, and diffuse large B-cell lymphoma identifies distinct tumor profile signatures." Molecular cancer therapeutics 4.12 (2005): 1867-1879. (Year: 2005).*
Wilson WH, Jung SH, Porcu P, Hurd D, Johnson J, Martin SE, Czuczman M, Lai R, Said J, Chadburn A, Jones D. A Cancer and Leukemia Group B multi-center study of DA-EPOCH-rituximab in untreated diffuse large B-cell lymphoma with analysis of outcome by molecular subtype. haematologica. May 2012;97(5):758. (Year: 2012).*
Bases RE, Mendez F. Topoisomerase inhibition by lucanthone, an adjuvant in radiation therapy. International journal of radiation oncology, biology, physics. Mar. 1, 1997;37(5):1133-7. (Year: 1997).*
Chen WC, Completo GC, Sigal DS, Crocker PR, Saven A, Paulson JC. In vivo targeting of B-cell lymphoma with glycan ligands of CD22. Blood, The Journal of the American Society of Hematology. Jun. 10, 2010;115(23):4778-86. (Year: 2010).*

(Continued)

*Primary Examiner* — Nissa M Westerberg
(74) *Attorney, Agent, or Firm* — KDW Firm PLLC

(57) ABSTRACT

The disclosure provides compounds of Formula I and their use in methods of modulating an immune response by inhibiting BFL1, and related methods for treating and preventing diseases and disorders characterized by inflammation, especially neutrophil induced inflammation.

12 Claims, 4 Drawing Sheets

(56) References Cited

OTHER PUBLICATIONS

Russ A, Hua AB, Montfort WR, Rahman B, Riaz IB, Khalid MU, Carew JS, Nawrocki ST, Persky D, Anwer F. Blocking "don't eat me" signal of CD47-SIRPα in hematological malignancies, an in-depth review. Blood reviews. 32(6):480-9, avaialble online Apr. 14, 2018 (Year: 2018).*

Blanz Jr EJ, French FA. A Systematic Investigation of Thioxanthen-9-ones and Analogs as Potential Antitumor Agents1, 2. Journal of Medicinal Chemistry. Mar. 1963;6(2):185-91. (Year: 1963).*

Ponzetta A, Carriero R, Carnevale S, Barbagallo M, Molgora M, Perucchini C, Magrini E, Gianni F, Kunderfranco P, Polentarutti N, Pasqualini F. Neutrophils driving unconventional T cells mediate resistance against murine sarcomas and selected human tumors. Cell. Jul. 11, 2019;178(2):346-60. (Year: 2019).*

Park IC, Lee SH, Whang DY, Hong WS, Choi SS, Shin HS, Choe TB, Hong SI. Expression of a novel Bcl-2 related gene, Bfl-1, in various human cancers and cancer cell lines. Anticancer research. Nov. 1, 1997;17(6D):4619-22. (Year: 1997).*

Jung-Ha H, Kim D, Lee SB, Hong SI, Park SY, Huh J, Kim CW, Kim SS, Lee Y, Choi SS, Shin HS. Expression of Bfl-1 in normal and tumor tissues: Bfl-1 overexpression in cancer is attributable to its preferential expression in infiltrating inflammatory cells. Human pathology. Jul. 1, 1998;29(7):723-8. (Year: 1998).*

Almanan et al. (May 1, 2017) "Type 1 Regulatory T Cells (Tr1) Homeostasis and Function in Aging", The Journal of Immunology, 198 (Supp 1), abstract only.

Belkaid et al. (Nov. 19, 2001) "The Role of Interleukin 10 (IL-10) in the Persistence of Leishmania Major in the Skin After Healing and the Therapeutic Potential of Anti-IL-10 Receptor Antibody for Sterile Cure", Journal of Experimental Medicine, 194(10):1497-1506.

Brooks et al. (Mar. 17, 2008) "IL-10 Blockade Facilitates DNA Vaccine Induced T-cell Responses and Enhances Clearance of Persistent Virus Infection", Journal of Experimental Medicine, 205(3):533-541.

Brooks et al. (Oct. 17, 2006) "Interleukin-10 Determines Viral Clearance or Persistence in Vivo", Nature Medicine, 12(11):1301-1309.

Chelvarajan et al. (Apr. 1, 2005) "The Unresponsiveness of Aged Mice to Polysaccharide Antigens is a Result of a Defect in Macrophage Function", Journal of Leukocyte Biology, 77(4):503-512.

Corsini et al. (Aug. 2006) "High Interleukin-10 Production is Associated with Low Antibody Response to Influenza Vaccination in the Elderly", Journal of Leukocyte Biology, 80:376-382.

Dobber et al. (Feb. 1995) "The in Vivo Effects of Neutralizing Antibodies Against IFN-y, IL-4, or IL-10 on the Humoral Immune Response in Young and Aged Mice", Cellular Immunology, 160(2):185-192.

Extended European Search Report for Application No. 19738033.0, mailed on Aug. 24, 2021, 9 pages.

Garner et al. (2017) "Progress in Targeting the BCL-2 Family of Proteins", Current Biology LTD, 39:133:142.

Hayney et al. (Jan. 2014) "Age and Psychological Influences on Immune Responses to Trivalent Inactivated Influenza Vaccine in the Meditation or Exercise for Preventing Acute Respiratory Infection (MEPARI) Trial", Human Vaccines & Immunotherapeutics, 10(1):83-91.

International Preliminary Report on Patentability received for PCT Application No. PCT/US2019/013468, mailed on Jul. 23, 2020, 9 pages.

International Preliminary Report on Patentability received for PCT Application No. PCT/US2019/013470, mailed for Jul. 23, 2020, 12 pages.

International Search Report and Written Opinion of the International Searching Authority mailed on Aug. 16, 2019 for International Application No. PCT/US2019/013470, filed Jan. 14, 2019 (20 pages).

International Search Report and Written Opinion received for PCT Application No. PCT/US2019/013468, mailed on May 23, 2019, 13 pages.

Peer et al. Science 2008 319(5863):627-30.

Mckinstry et al. (2009) "IL-10 Deficiency Unleashes an Influenza-Specific Th17 Response and Enhances Survival against High-Dose Challenge1", The Journal of Immunology, 182(12):7353-7363.

Neumann et al. (2014) "Role of BLIMP-1 in Programming Th Effector Cells into IL-10 Producers", Journal of Experimental Medicine, 211(9):1807-1819.

Ni et al. (Aug. 15, 2017) "Blocking IL-10 Signalling at the Time of Immunization Does Not Increase Unwanted Side Effects in Mice", BMC Immunology, 18(40):1-11.

O'Garra et al. (Jun. 2008) "Strategies for Use of IL-10 or its Antagonists in Human Disease", Immunological Reviews, 223(1):114-131.

Pitt et al. (Sep. 12, 2012) "Blockade of IL-10 Signaling during Bacillus Calmette-Guerin Vaccination Enhances and Sustains Th1, Th17, and Innate Lymphoid IFN-y and IL-17 Responses and Increases Protection to *Mycobacterium tuberculosis* Infection", The Journal of Immunology, 189(8):4079-4087.

Pradhan et al. (Apr. 8, 2014) "The Effect of Combined IL 10 siRNA and CpG ODN as Pathogen-Mimicking Microparticles on Th1ffh2 Cytokine Balance in Dendritic Cells and Protective Immunity against B Cell Lymphoma", Biomaterials, 35(21):5491-5504(25 pages).

Pubchem (Mar. 26, 2005) "1-[[3-(Diethylamino)-2-Hydroxypropyl]Amino]-4-Methylthioxanthen-9-One", Pubchem408723, 1-7 Pages.

Rudikoff et al. (Mar. 1982) "Single Amino Acid Substitution Altering Antigen-Binding Specificity", Proceedings of the National Academy of Sciences, 79(6):1979-1983.

Weinberger Birgit (2018) "Vaccines for the Elderly: Current Use and Future Challenges", Immunity & Aging, 15(3):1-8.

Xie et al. (Jul. 2017) "Bcl6 Promotes Follicular Helper T-cell Differentiation and PD-1 Expression in a Blimp1-independent Manner in Mice", European Journal of Immunology, 47(7):1136-1141.

Dunn, P.M., Sir George Newman, MD (1870-1948) and the prevention of perinatal disease. Arch Dis Child Fetal Neonatal Ed, 2005. 90: F278-280.

Ledger, W.J., Infection and premature labor. Am J Perinatol, 1989. 6: 234-236, abstract only.

Martin, J.A., B.E. Hamilton, M.J. Osterman, A.K. Driscoll, and T.J. Mathews, Births: Final Data for 2015. Natl Vital Stat Rep, 2017. 66: 1, abstract only.

Gravett, M.G., C.E. Rubens, P. Global Alliance to Prevent, and T. Stillbirth Technical, A framework for strategic investments in research to reduce the global burden of preterm birth. Am J Obstet Gynecol, 2012. 207: 368-373.

Liu, L., H.L. Johnson, S. Cousens, J. Perin, S. Scott, J.E. Lawn, I. Rudan, H. Campbell, R. Cibulskis, M. Li, C. Mathers, R.E. Black, W.H.O. Child Health Epidemiology Reference Group of, and Unicef, Global, regional, and national causes of child mortality: an updated systematic analysis for 2010 with time trends since 2000. Lancet, 2012. 379: 2151-2161, abstract only.

Goldenberg, R.L., J.F. Culhane, J.D. Iams, and R. Romero, Epidemiology and causes of preterm birth. Lancet, 2008. 371: 75-84.

Goldenberg, R.L., J.C. Hauth, and W.W. Andrews, Intrauterine infection and preterm delivery. N Engl J Med, 2000. 342: 1500-1507, abstract only.

Yoon, B.H., R. Romero, J.H. Lim, S.S. Shim, U.S. Hong, J.Y. Shim, and J.K. Jun, The clinical significance of detecting Ureaplasma urealyticum by the polymerase chain reaction in the amniotic fluid of patients with preterm labor. Am J Obstet Gynecol, 2003. 189: 919-924, abstract only.

DiGiulio, D.B., R. Romero, H.P. Amogan, J.P. Kusanovic, E.M. Bik, F. Gotsch, C.J. Kim, O. Erez, S. Edwin, and D.A. Relman, Microbial prevalence, diversity and abundance in amniotic fluid during preterm labor: a molecular and culture-based investigation. PLoS One, 2008. 3: e3056.

Wu, Y.W. and J.M. Colford, Jr., Chorioamnionitis as a risk factor for cerebral palsy: a meta-analysis. JAMA, 2000. 284: 1417-1424, abstract only.

(56) References Cited

OTHER PUBLICATIONS

Shatrov, J.G., S.C. Birch, L.T. Lam, J.A. Quinlivan, S. Mcintyre, and G.L. Mendz, Chorioamnionitis and cerebral palsy: a meta-analysis. Obstet Gynecol, 2010. 116: 387-392, abstract only.
Pappas, A., D.E. Kendrick, S. Shankaran, B.J. Stoll, E.F. Bell, A.R. Laptook, M.C. Walsh, A. Das, E.C. Hale, N.S. Newman, R.D. Higgins, H. Eunice Kennedy Shriver National Institute of Child, and N. Human Development Neonatal Research, Chorioamnionitis and early childhood outcomes among extremely low-gestational-age neonates. JAMA Pediatr, 2014. 168: 137-147, abstract only.
Been, J.V., S. Lievense, L.J. Zimmermann, B.W. Kramer, and T.G. Wolfs, Chorioamnionitis as a risk factor for necrotizing enterocolitis: a systematic review and meta-analysis. J Pediatr, 2013. 162: 236-242 e232.
Speer, C.P., Inflammation and bronchopulmonary dysplasia: a continuing story. Semin Fetal Neonatal Med, 2006. 11: 354-362, abstract only.
Redline, R.W., Inflammatory response in acute chorioamnionitis. Semin Fetal Neonatal Med, 2012. 17: 20-25, abstract only.
Romero, R., S.K. Dey, and S.J. Fisher, Preterm labor: one syndrome, many causes. Science, 2014. 345: 760-765.
Steel, J.H., K. O'Donoghue, N.L. Kennea, M.H. Sullivan, and A.D. Edwards, Maternal origin of inflammatory leukocytes in preterm fetal membranes, shown by fluorescence in situ hybridisation. Placenta, 2005. 26: 672-677.
Sampson, J.E., R.P. Theve, R.N. Blatman, T.D. Shipp, D.W. Bianchi, B.E. Ward, and R.M. Jack, Fetal origin of amniotic fluid polymorphonuclear leukocytes. Am J Obstet Gynecol, 1997. 176: 77-81, abstract only.
Mantovani, A., M.A. Cassatella, C. Costantini, and S. Jaillon, Neutrophils in the activation and regulation of innate and adaptive immunity. Nat Rev Immunol, 2011. 11: 519-531.
Rinaldi, S.F., R.D. Catalano, J. Wade, A.G. Rossi, and J.E. Norman, Decidual Neutrophil Infiltration is Not Required for Preterm Birth in a Mouse Model of Infection-Induced Preterm Labor. J Immunol, 2014. 192.
Filipovich, Y., V. Agrawal, S.E. Crawford, P. Fitchev, X. Qu, J. Klein, and E. Hirsch, Depletion of polymorphonuclear leukocytes has no effect on preterm delivery in a mouse model of *Escherichia coli*-induced labor. Am J Obstet Gynecol, 2015. 213: 697 e691-697 e610.
Hamilton, S.A., C.L. Tower, and R.L. Jones, Identification of chemokines associated with the recruitment of decidual leukocytes in human labour: potential novel targets for preterm labour. PLoS One, 2013. 8: e56946.
Presicce, P., P. Senthamaraikannan, M. Alvarez, C.M. Rueda, M. Cappelletti, L.A. Miller, A.H. Jobe, C.A. Chougnet, and S.G. Kallapur, Neutrophil recruitment and activation in decidua with intra-amniotic IL-1beta in the preterm rhesus macaque. Biol Reprod, 2015. 92: 56.
Gomez-Lopez, N., D. StLouis, M.A. Lehr, E.N. Sanchez-Rodriguez, and M. Arenas-Hernandez, Immune cells in term and preterm labor. Cell Mol Immunol, 2014.
Sadowsky, D.W., K.M. Adams, M.G. Gravett, S.S. Witkin, and M.J. Novy, Preterm labor is induced by intraamniotic infusions of interleukin-1beta and tumor necrosis factor-alpha but not by interleukin-6 or interleukin-8 in a nonhuman primate model. Am J Obstet Gynecol, 2006. 195: 1578-1589.
Sadowsky, D.W., G.J. Haluska, M.G. Gravett, S.S. Witkin, and M.J. Novy, Indomethacin blocks interleukin 1beta-induced myometrial contractions in pregnant rhesus monkeys. Am J Obstet Gynecol, 2000. 183: 173-180, Abstract only.
Sadowsky, D.W., M.J. Novy, S.S. Witkin, and M.G. Gravett, Dexamethasone or interleukin-10 blocks interleukin-1beta-induced uterine contractions in pregnant rhesus monkeys. Am J Obstet Gynecol, 2003. 188: 252-263.
Romero, R., M. Mazor, and B. Tartakovsky, Systemic administration of interleukin-1 induces preterm parturition in mice. Am J Obstet Gynecol, 1991. 165: 969-971, abstract only.

Hirsch, E., Y. Filipovich, and M. Mahendroo, Signaling via the type I IL-1 and TNF receptors is necessary for bacterially induced preterm labor in a murine model. Am J Obstet Gynecol, 2006. 194: 1334-1340, abstract only.
Kim, J., K. Zhao, P. Jiang, Z.X. Lu, J. Wang, J.C. Murray, and Y. Xing, Transcriptome landscape of the human placenta. BMC Genomics, 2012. 13: 115.
Dolan, S.M., M.V. Hollegaard, M. Merialdi, A.P. Betran, T. Allen, C. Abelow, J. Nace, B.K. Lin, M.J. Khoury, J.P. Ioannidis, S. Bagade, X. Zheng, R.A. Dubin, L. Bertram, D.R. Velez Edwards, and R. Menon, Synopsis of preterm birth genetic association studies: the preterm birth genetics knowledge base (PTBGene). Public Health Genomics, 2010 13: 514-523, abstract only.
Guzeloglu-Kayisli, O., U.A. Kayisli, N. Semerci, M. Basar, L.F. Buchwalder, C.S. Buhimschi, I.A. Buhimschi, F. Arcuri, K. Larsen, J.S. Huang, F. Schatz, and C.J. Lockwood, Mechanisms of chorioamnionitis-associated preterm birth: interleukin-1beta inhibits progesterone receptor expression in decidual cells. J Pathol, 2015. abstract only.
Gravett, M.G., G.J. Haluska, M.J. Cook, and M.J. Novy, Fetal and maternal endocrine responses to experimental intrauterine infection in rhesus monkeys. Am J Obstet Gynecol, 1996. 174: 1725-1731; discussion 1731-1723, abstract only.
Golos, T.G., G.I. Bondarenko, S.V. Dambaeva, E.E. Breburda, and M. Durning, On the role of placental Major Histocompatibility Complex and decidual leukocytes in implantation and pregnancy success using non-human primate models. Int J Dev Biol, 2010. 54: 431-443.
Rueda, C.M., P. Presicce, C.M. Jackson, L.A. Miller, S.G. Kallapur, A.H. Jobe, and C.A. Chougnet, Lipopolysaccharide-Induced Chorioamnionitis Promotes IL-1-Dependent Inflammatory FOXP3+ CD4+ T Cells in the Fetal Rhesus Macaque. J Immunol, 2016. 196: 3706-3715.
Dinarello, C.A., Blocking IL-1 in systemic inflammation. J Exp Med, 2005. 201: 1355-1359.
Rider, P., Y. Carmi, O. Guttman, A. Braiman, I. Cohen, E. Voronov, M.R. White, C.A. Dinarello, and R.N. Apte, IL-1alpha and IL-1beta recruit different myeloid cells and promote different stages of sterile inflammation. J Immunol, 2011. 187: 4835-4843.
Aksentijevich, I., S.L. et al., An autoinflammatory disease with deficiency of the interleukin-1-receptor antagonist. N Engl J Med, 2009. 360: 2426-2437.
Goldbach-Mansky, R., et al., Neonatal-onset multisystem inflammatory disease responsive to interleukin-1beta inhibition. N Engl J Med, 2006. 355: 581-592.
Fox, E., N. Jayaprakash, T.H. Pham, A. Rowley, C.L. McCully, F. Pucino, and R. Goldbach-Mansky, The serum and cerebrospinal fluid pharmacokinetics of anakinra after intravenous administration to non-human primates. J Neuroimmunol, 2010. 223: 138-140.
Gottipati, S., N.L. Rao, and W.P. Fung-Leung, IRAK1: a critical signaling mediator of innate immunity. Cell Signal, 2008. 20: 269-276, abstract only.
Berberich, I. and D.A. Hildeman, The Bcl2a1 gene cluster finally knocked out: first clues to understanding the enigmatic role of the Bcl-2 protein A1. Cell Death Differ, 2017. 24: 572-574.
Bittker, J.A., M. Weiwer, G. Wei, A. Germain, E. Brown, S. Dandapani, B. Munoz, M. Palmer, T. Golub, and S.L. Schreiber, Discovery of Inhibitors of Anti-Apoptotic Protein A1, in Probe Reports from the NIH Molecular Libraries Program. 2010: Bethesda (MD).
Vogler, M., M. Butterworth, A. Majid, R.J. Walewska, X.M. Sun, M.J. Dyer, and G.M. Cohen, Concurrent up-regulation of BCL-XL and BCL2A1 induces approximately 1000-fold resistance to ABT-737 in chronic lymphocytic leukemia. Blood, 2009. 113: 4403-4413.
Combs, C.A., M. Gravett, T.J. Garite, D.E. Hickok, J. Lapidus, R. Porreco, J. Rael, T. Grove, T.K. Morgan, W. Clewell, H. Miller, D. Luthy, L. Pereira, M. Nageotte, P.A. Robilio, S. Fortunato, H. Simhan, J.K. Baxter, E. Amon, A. Franco, K. Trofatter, K. Heyborne, and N. ProteoGenix/Obstetrix Collaborative Research, Amniotic fluid infection, inflammation, and colonization in preterm labor with intact membranes. Am J Obstet Gynecol, 2014. 210: 125 e121-125 e115.

(56) References Cited

OTHER PUBLICATIONS

Romero, R., J. Miranda, T. Chaiworapongsa, S.J. Korzeniewski, P. Chaemsaithong, F. Gotsch, Z. Dong, A.I. Ahmed, B.H. Yoon, S.S. Hassan, C.J. Kim, and L. Yeo, Prevalence and Clinical Significance of Sterile Intra-amniotic Inflammation in Patients with Preterm Labor and Intact Membranes. Am J Reprod Immunol, 2014. 72: 458-474.
Romero, R., J.C. Grivel, A.L. Tarca, P. Chaemsaithong, Z. Xu, W. Fitzgerald, S.S. Hassan, T. Chaiworapongsa, and L. Margolis, Evidence of perturbations of the cytokine network in preterm labor. Am J Obstet Gynecol, 2015. 213: 836 e831-836 e818.
Knox, I.C., Jr. and J.K. Hoerner, The role of infection in premature rupture of the membranes. Am J Obstet Gynecol, 1950. 59: 190-194, illust, abstract only.
Romero, R., J. Espinoza, W.T. Rogers, A. Moser, J.K. Nien, J.P. Kusanovic, F. Gotsch, O. Erez, R. Gomez, S. Edwin, and S.S. Hassan, Proteomic analysis of amniotic fluid to identify women with preterm labor and intra-amniotic inflammation/infection: the use of a novel computational method to analyze mass spectrometric profiling. J Matern Fetal Neonatal Med, 2008. 21: 367-388.
Dulay, A.T., I.A. Buhimschi, G. Zhao, M.O. Bahtiyar, S.F. Thung, M. Cackovic, and C.S. Buhimschi, Compartmentalization of acute phase reactants Interleukin-6, C-Reactive Protein and Procalcitonin as biomarkers of intra-amniotic infection and chorioamnionitis. Cytokine, 2015. 76: 236-243.
Girard, S., L. Tremblay, M. Lepage, and G. Sebire, IL-1 receptor antagonist protects against placental and neurodevelopmental defects induced by maternal inflammation. J Immunol, 2010. 184: 3997-4005.
Nadeau-Vallee, M., C. Quiniou, J. Palacios, X. Hou, A. Erfani, A. Madaan, M. Sanchez, K. Leimert, A. Boudreault, F. Duhamel, J.C. Rivera, T. Zhu, B. Noueihed, S.A. Robertson, X. Ni, D.M. Olson, W. Lubell, S. Girard, and S. Chemtob, Novel Noncompetitive IL-1 Receptor-Biased Ligand Prevents Infection- and Inflammation-Induced Preterm Birth. J Immunol, 2015. 195: 3402-3415.
Fidel, P.L., Jr., R. Romero, J. Cutright, N. Wolf, R. Gomez, H. Araneda, M. Ramirez, and B.H. Yoon, Treatment with the interleukin-I receptor antagonist and soluble tumor necrosis factor receptor Fc fusion protein does not prevent endotoxin-induced preterm parturition in mice. J Soc Gynecol Investig, 1997. 4: 22-26, abstract only.
Baggia, S., M.G. Gravett, S.S. Witkin, G.J. Haluska, and M.J. Novy, Interleukin-1 beta intra-amniotic infusion induces tumor necrosis factor-alpha, prostaglandin production, and preterm contractions in pregnant rhesus monkeys. J Soc Gynecol Investig, 1996. 3: 121-126, abstract only.
Adams Waldorf, K.M., D. Persing, M.J. Novy, D.W. Sadowsky, and M.G. Gravett, Pretreatment with toll-like receptor 4 antagonist inhibits lipopolysaccharide-induced preterm uterine contractility, cytokines, and prostaglandins in rhesus monkeys. Reprod Sci, 2008. 15: 121-127.
Kallapur, S.G., P. Presicce, P. Senthamaraikannan, M. Alvarez, A.F. Tarantal, L.M. Miller, A.H. Jobe, and C.A. Chougnet, Intra-Amniotic IL-1beta Induces Fetal Inflammation in Rhesus Monkeys and Alters the Regulatory T Cell/IL-17 Balance. J Immunol, 2013. 191: 1102-1109.
Leon, L.R., C.A. Conn, M. Glaccum, and M.J. Kluger, IL-1 type I receptor mediates acute phase response to turpentine, but not lipopolysaccharide, in mice. Am J Physiol, 1996. 271: R1668-1675, abstract only.
Liao, J., V.S. Kapadia, L.S. Brown, N. Cheong, C. Longoria, D. Mija, M. Ramgopal, J. Mirpuri, D.C. McCurnin, and R.C. Savani, The NLRP3 inflammasome is critically involved in the development of bronchopulmonary dysplasia. Nat Commun, 2015. 6: 8977.
Kallapur, S.G., I. Nitsos, T.J. Moss, G.R. Polglase, J.J. Pillow, F.C. Cheah, B.W. Kramer, J.P. Newnham, M. Ikegami, and A.H. Jobe, IL-1 mediates pulmonary and systemic inflammatory responses to chorioamnionitis induced by lipopolysaccharide. Am J Respir Crit Care Med, 2009. 179: 955-961.

Chandra, Rachna et al. "IRAK1-dependent signaling mediates mortality in polymicrobial sepsis." Inflammation vol. 36,6 (2013): 1503-12. doi:10.1007/s10753-013-9692-1.
Jacob, C.O., et al., Identification of IRAK1 as a risk gene with critical role in the pathogenesis of systemic lupus erythematosus. Proc Natl Acad Sci U S A, 2009. 106: 6256-6261.
Bobbin and Rossi Annu Rev. Pharmacol Toxicol 2016 56:103-122.
Jain, A., S. Kaczanowska, and E. Davila, IL-1 Receptor-Associated Kinase Signaling and Its Role in Inflammation, Cancer Progression, and Therapy Resistance. Front Immunol, 2014. 5: 553.
Rhyasen, G.W., L. Bolanos, J. Fang, A. Jerez, M. Wunderlich, C. Rigolino, L. Mathews, M. Ferrer, N. Southall, R. Guha, J. Keller, C. Thomas, L.J. Beverly, A. Cortelezzi, E.N. Oliva, M. Cuzzola, J.P. Maciejewski, J.C. Mulloy, and D.T. Starczynowski, Targeting IRAK1 as a therapeutic approach for myelodysplastic syndrome. Cancer Cell, 2013. 24: 90-104.
Kallquist, L., M. Hansson, A.M. Persson, H. Janssen, J. Calafat, H. Tapper, and I. Olsson, The tetraspanin CD63 is involved in granule targeting of neutrophil elastase. Blood, 2008. 112: 3444-3454.
Luo, H.R. and F. Loison, Constitutive neutrophil apoptosis: mechanisms and regulation. Am J Hematol, 2008. 83: 288-295.
Vier, J., M. Groth, M. Sochalska, and S. Kirschnek, The antiapoptotic Bcl-2 family protein A1/Bfl-1 regulates neutrophil survival and homeostasis and is controlled via PI3K and JAK/STAT signaling. Cell Death Dis, 2016. 7: e2103.
Rossi, A.G., D.A. Sawatzky, A. Walker, C. Ward, T.A. Sheldrake, N.A. Riley, A. Caldicott, M. Martinez-Losa, T.R. Walker, R. Duffin, M. Gray, E. Crescenzi, M.C. Martin, H.J. Brady, U.S. Savill, I. Dransfield, and C. Haslett, Cyclin-dependent kinase inhibitors enhance the resolution of inflammation by promoting inflammatory cell apoptosis. Nat Med, 2006. 12: 1056-1064.
Koedel, U., T. Frankenberg, S. Kirschnek, B. Obermaier, H. Hacker, R. Paul, and G. Hacker, Apoptosis is essential for neutrophil functional shutdown and determines tissue damage in experimental pneumococcal meningitis. PLoS Pathog, 2009. 5: e1000461.
Hampson, P., J. Hazeldine, and J.M. Lord, Neutrophil apoptosis and its induction as a potential treatment for chronic inflammatory disease. Curr Opin Hematol, 2013. 20: 10-15.
Smith, R., Parturition. N Engl J Med, 2007. 356: 271-283.
Bugl, S., S. Wirths, M.P. Radsak, H. Schild, P. Stein, M.C. Andre, M.R. Muller, E. Malenke, T. Wiesner, M. Marklin, J. S. Frick, R. Handgretinger, H.G. Rammensee, L. Kanz, and H.G. Kopp, Steady-state neutrophil homeostasis is dependent on TLR4/TRIF signaling. Blood, 2013. 121: 723-733.
Clynes, R.A., T.L. Towers, L.G. Presta, and J.V. Ravetch, Inhibitory Fc receptors modulate in vivo cytotoxicity against tumor targets. Nat Med, 2000. 6: 443-446.
International Search Report and Written Opinion of the International Searching Authority mailed on Nov. 24, 2020 for International Application No. PCT/US2020/070249, filed Jul. 9, 2020, 17 pages.
PUBCHEM-CID: 408723 Create Date: Mar. 26, 2005 (Mar. 26, 2005) pp. 1-7, p. 2, structure.
Presicce et al., "IL-1 signaling mediates intrauterine inflammation and chorio-decidua netrophil recruitment and activation", JCI Insight, 2018, vol. 3(6), article e98306, pp. 1-16. https://doi.org/10.1172/jci.insight.98306.
Subramaniam, A., A. Abramovici, W.W. Andrews, and A.T. Tita, Antimicrobials for preterm birth prevention: an overview. Infect Dis Obstet Gynecol, 2012. 2012: 157159.
Redline, R.W., O. Faye-Petersen, D. Heller, F. Qureshi, V. Savell, and C. Vogler, Amniotic infection syndrome: nosology and reproducibility of placental reaction patterns. Pediatr Dev Pathol, 2003. 6: 435-448.
Leverson, A New Staple: Peptide-Targeted Covalent Inhibitors, Cell Chemical Biology (2016).
Thorman, Alexander., "Rational Design of Novel BCL2A1 Inhibitors for Treatment of Autoimmune Diseases: An Integration of Virtual Screening, Transcriptomics and Protein Biophysics" A Dissertation submitted to the Graduate School of the University of Cincinnati—2018, up to p. 8.

(56) References Cited

OTHER PUBLICATIONS

Czikk et al., "Chorioamnionitis: from pathogenesis to treatment," Clinical Microbiology and infection, vol. 17, No. 9: 1304-1311 (Sep. 2011).
Ericson et al., "Chorioamnionitis," Clinics in Perinatology, vol. 42, No. 1: 155-165 (Mar. 2015).
Ismail, "Testing BCL2A1 Small Molecule Inhibitors in Fluorescence Polarization Assays," University of Cincinnati [Thesis]: 57 pages (Jun. 2020).
Park et al., "The Intensity of BCL2A1 Expression Increases According to the Stage Progression of Acute Histologic Chorioamnionitis in the Extra-Placental Membranes of Spontaneous Preterm Birth," Life, vol. 14, No. 12: 11 pages (Nov. 2024).
Volochnyuk et al., "Approach to the Library of Fused Pyridine-4-carboxylic Acids by Combes-Type Reaction of Acyl Pyruvates and Electron-Rich Amino Heterocycles," Journal of Combinatorial Chemistry, Vol. 12, No. 4: 510-517 (Mar. 2018).
International Search Report and Written Opinion of the International Searching Authority mailed Mar. 18, 2025, 17 pages.

\* cited by examiner

COMPOUNDS USEFUL FOR INHIBITING BFL1 AND THEIR USE IN THERAPY

CROSS-REFERENCE TO RELATED APPLICATIONS

This application is a national stage entry, filed under 35 U.S.C. § 371, of International Application No. PCT/US2020/070249, filed on Jul. 9, 2020, which claims the benefit of U.S. Patent No. 62/872,822, filed on Jul. 11, 2019, the entire contents of which is hereby incorporated herein by reference in its entirety and for all purposes.

STATEMENT REGARDING FEDERALLY-SPONSORED RESEARCH

This invention was made with government support under R21 HD090856 awarded by the National Institutes of Health. The U.S. Government has certain rights in the invention.

FIELD OF THE INVENTION

The disclosure provides compounds that are inhibitors of BFL1 and their use in methods of modulating an immune response and related methods for treating and preventing diseases and disorders characterized by excessive inflammation.

BACKGROUND

Members of the BCL2 family of proteins are related through homology of their BCL2 homology (BH) domains. The proteins of this family may be divided into three main classes based on their activity in relation to cellular apoptosis: 1) anti-apoptotic or pro-survival factors; 2) pro-apoptotic activators or cytotoxic agents; and 3) pro-apoptotic sensitizers or effectors. Upon stress signaling, cells undergo apoptosis via mitochondrial outer membrane permeabilization (MOMP), which is driven by pro-apoptotic BCL2 family members. The pro-apoptotic BCL2 proteins are comprised of BH3-only proteins, such as NOXA, PUMA, and BIM that serve as sensitizers, and the multi-domain proteins, BAX and BAK that function as cytotoxic agents, promoting apoptosis. The BH3-only peptides either directly (through physical interaction) or indirectly (through interaction with anti-apoptotic Bcl-2 family members) activate BAX and BAK to promote mitochondrial membrane permeabilization and are upregulated during times of cell stress.

Pro-survival BCL2 proteins function through either prevention of BAX/BAK activity or sequestration of BH3-only activator proteins, resulting in inactive BAX/BAK. The pro-survival BCL2 family proteins sequester the pro-apoptotic members, driving a pro-survival phenotype and blocking MOMP. A number of family members have been described with varying targets and cell types in which they are present, including BCL2, Bcl-XL, Bcl-w, MCL1, BCL-B and BCL2A1.

BFL1 is the human ortholog of murine BCL2A1. The two proteins share 72% amino acid sequence identity. BFL1/BCL2A1 functions as a regulator of T-cell and neutrophil maturation and of the maintenance of $CD4^+$ T-cells. Knock-out mice for all isoforms demonstrate decreased total $CD4^+$ T cells, regulatory T-cells, and conventional dendritic cells in the spleen, but have an otherwise benign phenotype.

SUMMARY

Applicants have previously demonstrated that BCL2A1/BFL1 is a therapeutic target in the prophylaxis and treatment of diseases and disorders characterized by excessive inflammation, particularly neutrophil-mediated inflammation, and in the treatment of cancers overexpressing BCL2A1/BFL1. Accordingly, the present disclosure provides methods for attenuating an immune response, methods for treating an autoimmune disease or allergic disorder characterized by neutrophil-mediated inflammation, methods for the prevention of pre-term birth and the treatment of chorioamnionitis, and methods for the treatment of cancer, in a subject in need thereof, the methods comprising administering to the subject a compound of Formula I, or a derivative thereof, which is an inhibitor of BFL1 where the subject is a human.

In embodiments, the autoimmune disease or allergic disorder is selected from anaphylaxis, asthma, atopic dermatitis, cystic fibrosis, irritable bowel syndrome (IBD), lupus erythematosus, psoriasis, and rheumatoid arthritis.

In embodiments, the cancer is selected from adrenocortical carcinoma (ACC), acute myeloid leukemia (AML), bladder cancer, breast cancer, cervical cancer, cholangiocarcinoma, colorectal cancer, diffuse large B-cell (DLBC) lymphoma, glioblastoma multiforme (GBM), glioma, head and neck cancer, liver cancer, lung cancer, melanoma, mesothelioma, ovarian cancer, pheochromocytoma and paraganglioma (PCPG), pancreatic cancer, prostate cancer, sarcoma, testicular germ cell cancer, thymoma, thyroid cancer, uterine cancer, uveal melanoma, clear cell renal cell carcinoma (ccRCC), chromophobe renal cell carcinoma (chRCC), and papillary renal cell carcinoma (pRCC). In some embodiments, the cancer is selected from acute myeloid leukemia (AML), breast cancer, diffuse large B-cell lymphoma (DLBCL), head and neck cancer, lung cancer, melanoma, mesothelioma, ovarian cancer, pancreatic cancer, testicular germ cell cancer, thymoma, uterine cancer, clear cell renal cell carcinoma (ccRCC), chromophobe renal cell carcinoma (chRCC), and papillary renal cell carcinoma (pRCC).

In embodiments, the compound of Formula I, or a derivative thereof, binds to BFL1, preferably to the P2 or P4 pocket, or both, of the BH3 domain of BFL1. In some embodiments, the compound of Formula I, or a derivative thereof, is optionally encapsulated within a liposome-based nanoparticle comprising a targeting moiety, and the targeting moiety is selected from a polypeptide or an antibody, or antigen-binding fragment thereof, that binds to a neutrophil-specific cell surface glycoprotein, preferably selected from CD177, CD66b, SIRPa, and SIGLEC9.

In embodiments, the inhibitor is the compound designated 1.001 in Table 1, or a derivative thereof.

In accordance with any of the foregoing embodiments, the subject may be a human subject.

In some embodiments, the subject in need is one whose disease or disorder is characterized by inflammation, particularly neutrophil-mediated inflammation, or whose cancer is characterized by overexpression of BFL1.

In accordance with any of the foregoing embodiments, a compound of Formula I, or derivative thereof, which is an BFL1 inhibitor may be encapsulated in a liposome-based nanoparticle comprising a targeting moiety selected from a polypeptide or an antibody, or antigen-binding fragment thereof, that binds to a neutrophil-specific cell surface glycoprotein, preferably selected from CD177, CD66b, SIRPa, and SIGLEC9.

(C), 1.004 (D), 1.005 (E), and 1.006 (F). IC50 values for each compound are shown in Table 1.

Figure 1A:
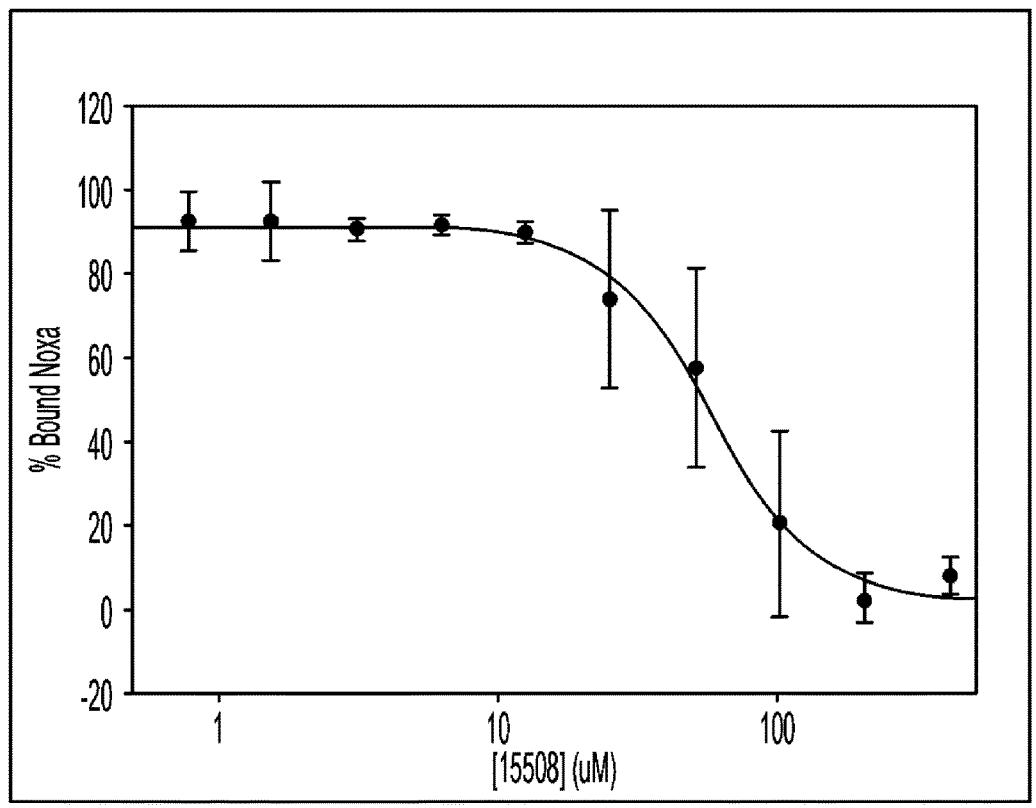
FIG. 1A-1F: fluorescence polarization (FP) assay dose-response curves for Compounds 1.001 (A), 1.002 (B), 1.003
Figure 1B:
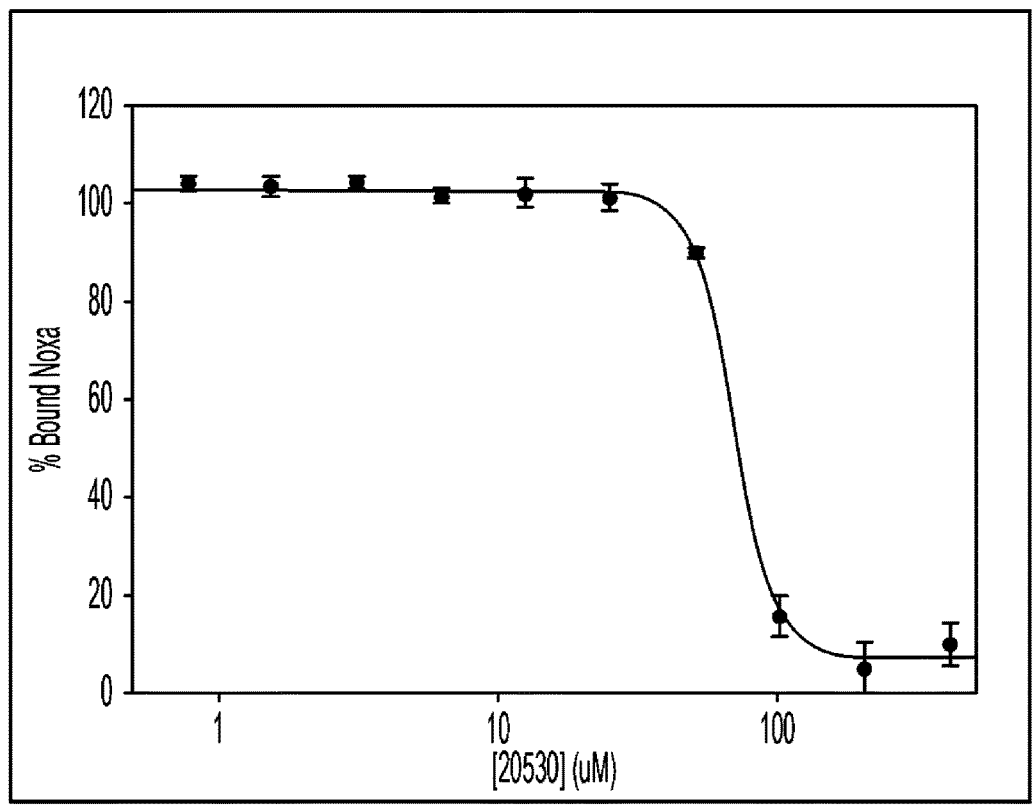
Figure 1C:
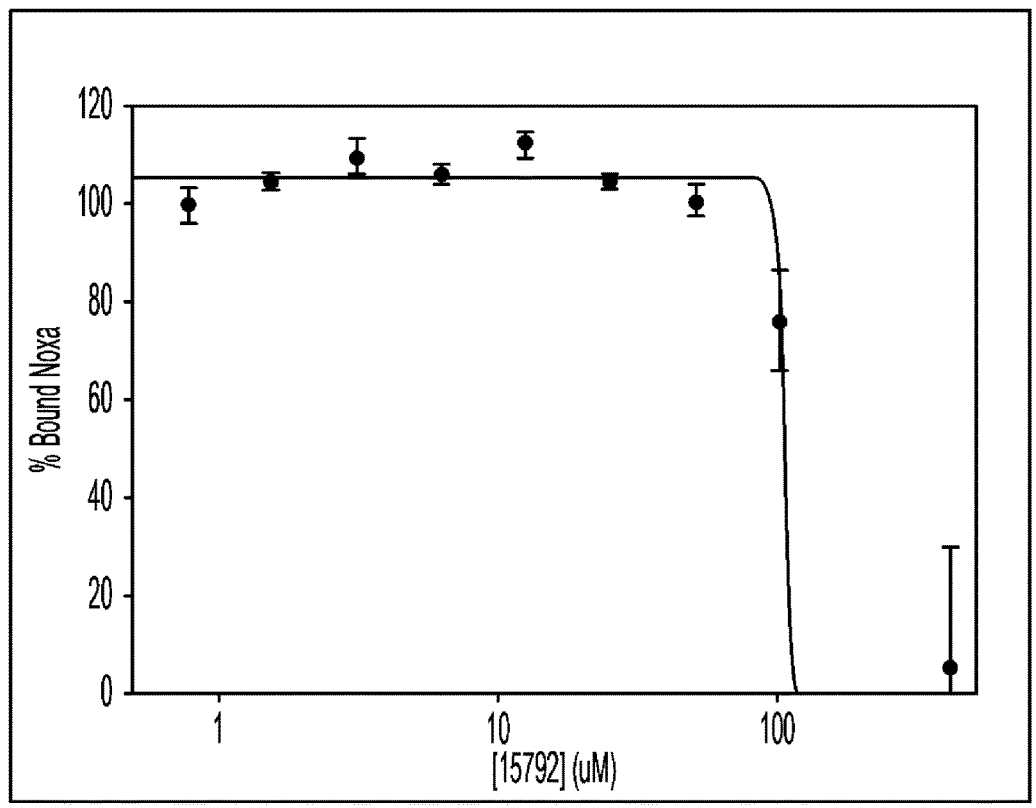
Figure 1D:
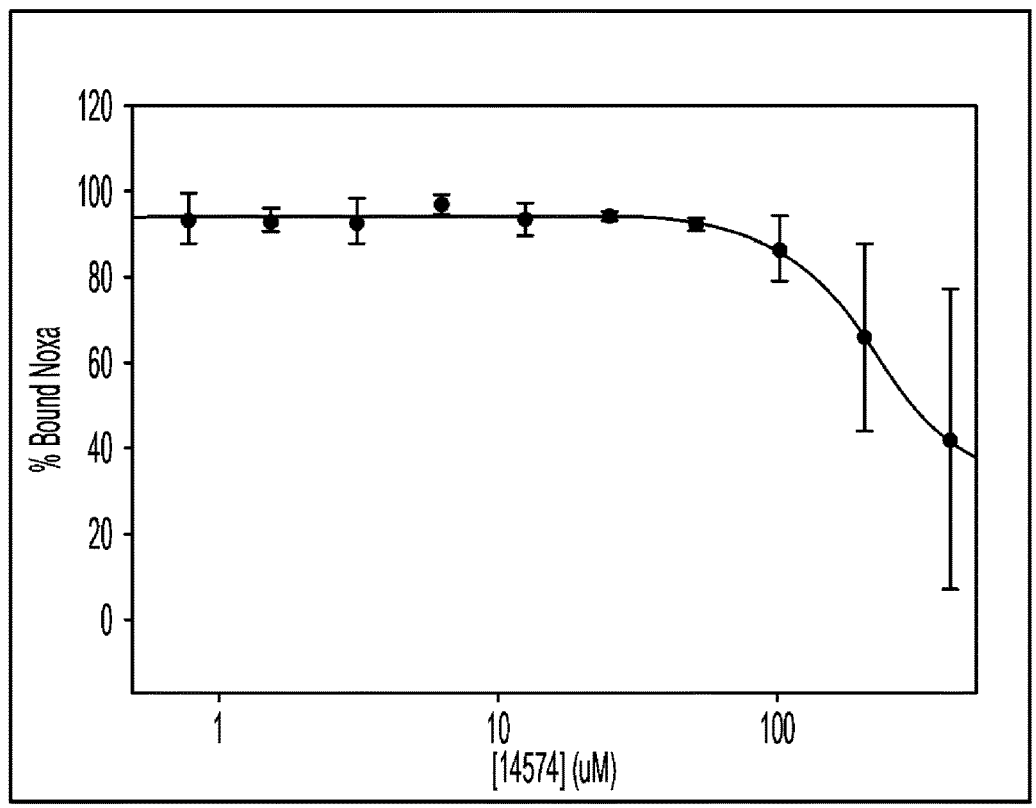
Figure 1E:
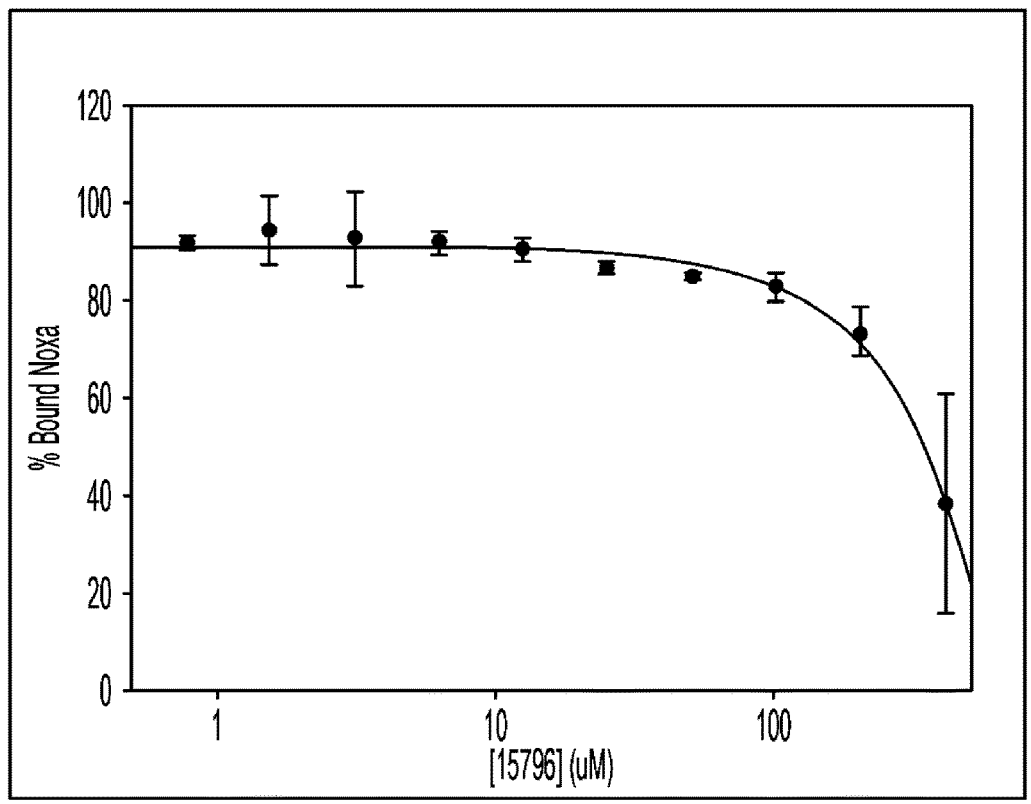
Figure 1F:
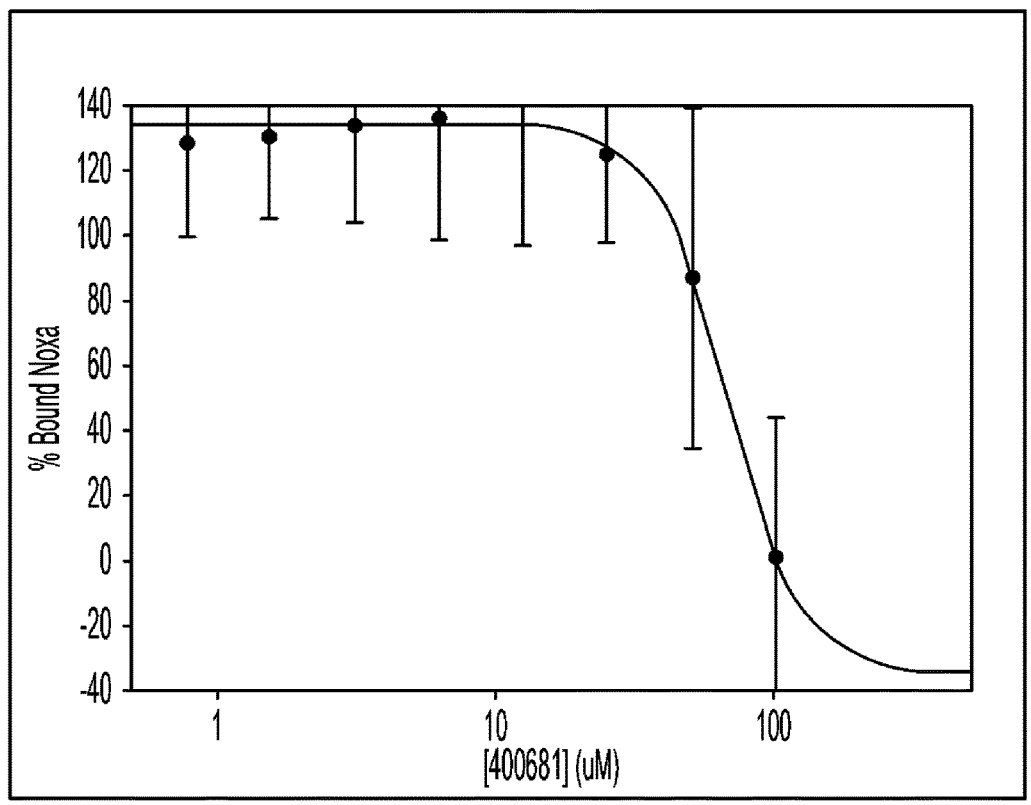
Figure 2:
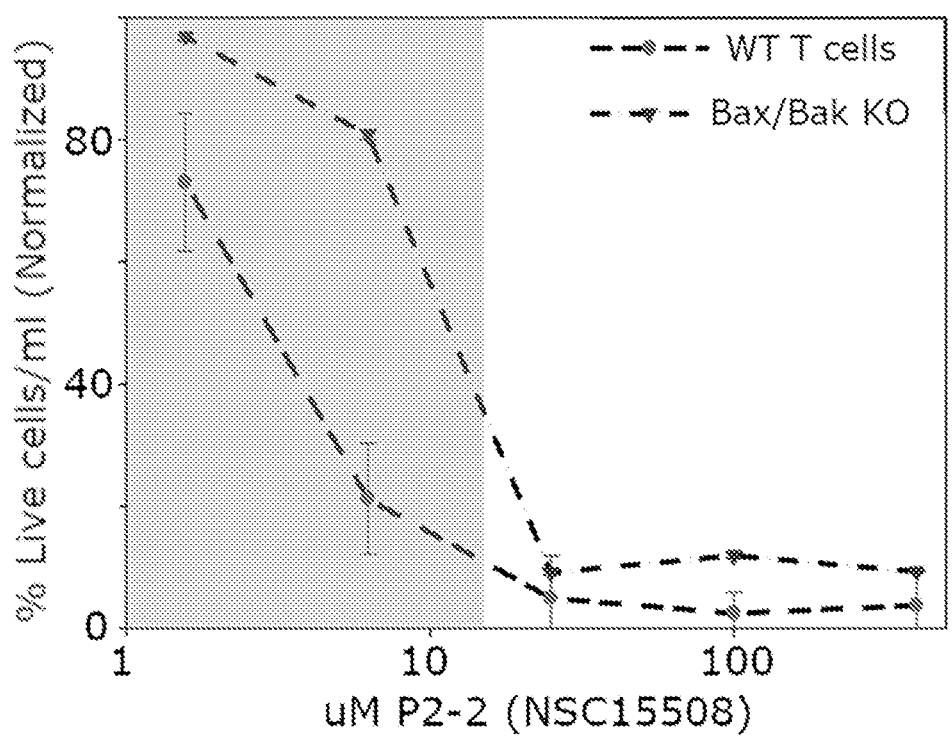

FIG. 2: Graphical representation of in vitro apoptosis assay using murine T cells obtained from splenocytes of either wild-type (WT, circles) or Bax/Bak knock-out (Bax/Bak KO, triangles) mice in the presence of Compound 1.001.

DETAILED DESCRIPTION

The present disclosure provides methods for modulating an immune response by inhibiting BCL2A1/BFL1. The murine (BCL2A1) and human (BFL1) proteins are highly conserved, particularly in their BH3 binding domain, or "BH3 groove" and the proteins are referred to interchangeably herein, with respect to inhibition thereof, although inhibitors targeted to the human protein BFL1 are preferred.

The methods described here include the prevention of pre-term birth and the treatment of chorioamnionitis by inhibition of BCL2A1/BFL1, or more specifically through the inhibition of the human ortholog BFL1. The inventors previously found that BCL2A1/BFL1 promotes the survival of pro-inflammatory neutrophils during chorioamnionitis. This pro-survival function in relation to inflammatory neutrophils indicates its feasibility as a target in the treatment of other diseases and disorders characterized by excessive neutrophil-mediated inflammation.

The present disclosure provides compounds of Formula I and their use for treating diseases and disorders characterized by excessive inflammation, particularly neutrophil-mediated inflammation, by inhibiting BFL1. In embodiments, the diseases and disorders characterized by excessive inflammation is an autoimmune disease or allergic disorder. In embodiments, the autoimmune disease or allergic disorder is selected from anaphylaxis, asthma, atopic dermatitis, cystic fibrosis, irritable bowel syndrome (IBD), including more specifically one or both of Crohn's disease and ulcerative colitis, lupus erythematosus, psoriasis, and rheumatoid arthritis.

It is well-established that cancer cells can circumvent mitochondrial apoptosis by overexpressing BCL-2 family pro-survival proteins, such as BCL-2 and MCL-1. BCL-2 family pro-survival proteins as a group prevent apoptosis by sequestering pro-apoptosis family members in a groove on the surface of the protein, referred to herein as the "BH3 groove". This groove binds to the BCL-2 homology 3 ("BH3") domain helix of the pro-apoptotic family members, thereby sequestering them and promoting cell survival. Small molecule and peptide mimetics of the BH3 helix that bind this groove have been demonstrated to be able to reactivate apoptosis and inhibitors of BCL-2 family pro-survival proteins have shown promise as anti-cancer agents. For example, a number of therapeutic agents have targeted BCL2-family proteins with varying degrees of success, most notably ABT-737, ABT-263, ML214 and ABT-199 (venetoclax). ABT-737, ABT-263 (navitoclax) and ML214 target the BCL2-family broadly, inhibiting BCL-2, BCL-xL, and BCL-W. ABT-199 is a more targeted therapeutic that specifically inhibits BCL-2, but not other family members.

In embodiments, the disclosure provides methods of treating a cancer in a subject in need thereof, the methods comprising administering to the subject a compound of Formula I, or a derivative thereof. In embodiments, the cancer is selected from adrenocortical carcinoma (ACC), acute myeloid leukemia (AML), bladder cancer, breast cancer, cervical cancer, cholangiocarcinoma, colorectal cancer, diffuse large B-cell lymphoma (DLBC or DLBCL, a type of Non-Hodgkins lymphoma), glioblastoma multiforme (GBM), glioma, head and neck cancer liver cancer, lung cancer, melanoma, mesothelioma, ovarian cancer, pheochromocytoma and paraganglioma (PCPG), pancreatic cancer, prostate cancer, sarcoma, testicular germ cell cancer, thymoma, thyroid cancer, uterine cancer, uveal melanoma, clear cell renal cell carcinoma (ccRCC), chromophobe renal cell carcinoma (chRCC), and papillary renal cell carcinoma (pRCC).

In embodiments, the compound of Formula I, or a derivative thereof, is targeted for delivery to activated tissue neutrophils. Targeted delivery systems that may be used include nanoparticles comprised of various materials, for example liposomes, polymers, dendrimers, and magnetic nanoparticles. Nanoparticulate delivery systems suitable for targeting a BCL2A1/BFL1 inhibitor to activated tissue neutrophils include liposome based nanoparticles such as those described in Gautam et al *J. Drug Delivery Sci. Tech.* 2017 260-268 and Peer et al. *Science* 2008 319(5863):627-30. For example, the liposome-based nanoparticles may comprise nanoparticular sized (50-500 nm diameter) liposomes formed from neutral phospholipids comprising a glycosaminoglycan such as hyaluronan to which a targeting moiety is attached. In embodiments, the liposomes are loaded with a BCL2A1/BFL1 inhibitor selected from a small organic molecule and an RNAi agent, for example an anti-BFL1 siRNA. In embodiments, the targeting moiety is selected from a polypeptide or an antibody, or antigen-binding fragment thereof, that binds to a neutrophil-specific cell surface glycoprotein. In embodiments, the neutrophil-specific cell surface glycoprotein is selected from a cluster of differentiation ("CD") protein including CD177 and CD66b, signal regulatory protein alpha ("SIRPa"), and sialic acid-binding Ig-like lectin 9 (SIGLEC9). In some embodiments, the targeting moiety may be an antibody or antigen binding fragment thereof that targets proteinase 3 ("PRTN3").

In the context of the methods described here, the term "treating" may refer to the amelioration or stabilization of one or more symptoms associated with the disease, disorder or condition being treated. The term "treating" may also encompass the management of disease, disorder or condition, referring to the beneficial effects that a subject derives from a therapy but which does not result in a cure of the underlying disease, disorder, or condition. In the context of the present disclosure, the term "prevention" refers to preventing the recurrence, development, progression or onset of one or more symptoms of the disease, disorder, or condition.

In embodiments where a therapeutically effective amount of a compound or composition is administered to a subject, the therapeutically effective amount is the amount sufficient to achieve a desired therapeutic outcome, for example the amelioration or stabilization of one or more symptoms of the disease, disorder or condition being treated, or in the context of prevention, the amount sufficient to achieve prevention of the recurrence, development, progression or onset of one or more symptoms of the disease, disorder, or condition.

In embodiments, a therapeutically effective amount is the amount required to achieve at least an equivalent therapeutic effect compared to a standard therapy. An example of a standard therapy is an FDA-approved drug indicated for treating the same disease, disorder or condition.

In the context of any of the methods described here, the subject is preferably a human but may be a non-human vertebrate. In other embodiments, the non-human vertebrate may be, for example, a dog, cat, a rodent (e.g., a mouse, a rat, a rabbit), a horse, a cow, a sheep, a goat, a chicken, a duck, or any other non-human vertebrate.

In embodiments, the human subject is selected from an adult human, a pediatric human, or a geriatric human, as those terms are understood by the medical practitioner, for example as defined by the U.S. Food and Drug Administration.

In some embodiments, a compound of Formula I binds to the "P4" pocket of BCL2A1/BFL1. All BCL2 family pro-survival proteins contain a conserved hydrophobic pocket, referred to as the "P2" pocket, of the BH3-binding groove (also referred to herein as the "BH3 binding domain") of the protein. In the case of BCL2A1/BFL1, the BH3-binding groove extends into a broad, shallow pocket, which is not present in other family members. This pocket therefore provides a unique surface for identifying and/or targeting small molecules with BCL2A1/BFL1 binding specificity, referred to herein as the "P4" pocket and described more fully in Example 2 and related drawings. The disclosure provides exemplary compounds that bind specifically to the P4 or P2 pocket of BCL2-A1/BFL1. The disclosure further provides that compounds which bind to the P4 pocket may be used in combination with compounds that bind to the P2 pocket as inhibitors of BCL2A1/BFL1.

In embodiments, the compound of Formula I, or a derivative thereof, is a direct BFL1 inhibitor. In this context, the direct inhibitor may be one that binds directly to the BH3 binding domain of BCL2A1/BFL1, for example in the P2 pocket or the P4 pocket of the BH3 binding domain; or one that binds to another region of the BCL2A1/BFL1 but nevertheless inhibits the interaction of the BH3 binding domain with its target proteins, e.g., through steric hindrance or through an allosteric interaction. For example, the compound may bind to the P2 or P4 pocket. Alternatively, the compound may not directly bind the P2 or P4 pocket, but may bind another region of BCL2A1/BFL1 and thereby allosterically inhibit the interaction of the BH binding domain with its target proteins, for example by changing the confirmation or shape of the domain.

In embodiments, a compound for use in the methods described here binds to BFL1 and does not interact substantially with other human BCL-2 family proteins. In some embodiments, the compound does not bind to IL-1 and is not an IL-1 inhibitor.

Compounds of Formula I

The disclosure provides compounds of Formula I which bind to either the P2 or the P4 pocket of BCL2A1/BFL1 and are inhibitors of BCL2A1/BFL1:

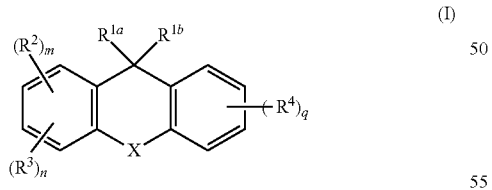
(I)

X is selected from the group consisting of S and O;

$R^{1a}$ is selected from the group consisting of —O—C(O)—$X^1$—O—$Ar^1$, —$NR^a$—C(O)—$X^1$—O—$Ar^1$, —O—C(O)—$X^1$—$Ar^1$ and —$NR^a$—C(O)—$X^1$—$Ar^1$;

$R^{1b}$ is H; or $R^{1a}$ and $R^{1b}$ are combined to form an oxo or thioxo moiety, wherein $R^a$ is selected from the group consisting of H, $C_{1-8}$ alkyl, and $C_{1-8}$ haloalkyl;

$X^1$ is $C_{1-6}$ alkylene substituted with from 0 to 3 moieties selected from the group consisting of halo, hydroxyl, and amino; and $Ar^1$ is selected from the group consisting of $C_{6-10}$ aryl; and a 5 to 10 membered heteroaryl having 1-4 heteroatom ring vertices selected from the group consisting of O, N, and S, wherein the aryl or heteroaryl are substituted with from 0 to 4 moieties selected from the group consisting of $C_{1-8}$ alkyl, halo, hydroxyl, $C_{1-8}$ haloalkyl and $C_{1-8}$ hydroxyalkyl;

$R^2$ is selected from the group consisting of —$NR^b$—$X^2$—$NR^cR^d$, —O—$X^2$—$NR^cR^d$, —$NR^b$—$X^2$—$OR^c$, —O—$X^2$—$OR^c$; and —$X^2$—$NR^cR^d$, wherein $R^b$ is selected from the group consisting of H, $C_{1-8}$ alkyl, and $C_{1-8}$ haloalkyl;

$X^2$ is $C_{1-6}$ alkylene substituted with from 0 to 3 moieties selected from the group consisting of halo, hydroxyl, and amino; and $R^c$ and $R^d$ are independently selected from the group consisting of H, $C_{1-8}$ alkyl, $C_{1-8}$ hydroxyalkyl, and $C_{1-8}$ haloalkyl;

the subscript m is an integer selected from 0 to 1;

each $R^3$ and $R^4$ are independently selected from the group consisting of halo, $C_{1-8}$ alkyl, and $C_{1-8}$ haloalkyl;

the subscript n is an integer selected from 0 to 2; and the subscript q is an integer selected from 0 to 2;

provided that when $R^{1a}$ and $R^{1b}$ are combined to form an oxo or thioxo moiety, the subscript m is 1.

In embodiments, Formula I is represented by Formula Ia

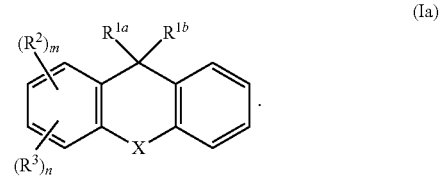
(Ia)

In embodiments, Formula I is represented by Formula Ib

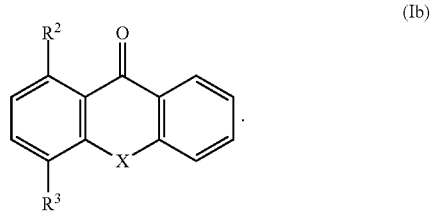
(Ib)

In embodiments, Formula I is represented by Formula Ic

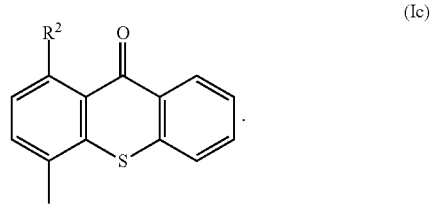
(Ic)

In embodiments, Formula I is represented by Formula Id

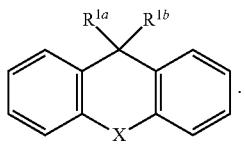

(Id)

In embodiments, Formula I is represented by Formula Ie

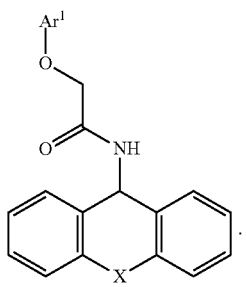

(Ie)

In embodiments, X in Formula I, Ia, Ib, Id, or Ie is S.

In embodiments, X in Formula I, Ia, Ib, Id, or Ie is O.

In some embodiments, $R^{1a}$ in Formula I, Ia, Id, or Ie is selected from the group consisting of —O—C(O)—$X^1$—O—$Ar^1$, and —$NR^a$—C(O)—$X^1$—O—$Ar^1$.

In some embodiments, $R^{1a}$ in Formula I, Ia, or Id is —$NR^a$—C(O)—$X^1$—O—$Ar^1$.

In some embodiments, $R^a$ in Formula I, Ia, or Id is H or $C_{1-8}$ alkyl.

In some embodiments, $X^1$ in Formula I, Ia, or Id is $C_{1-3}$ alkylene substituted with from 0 to 2 moieties selected from the group consisting of halo and hydroxyl.

In some embodiments, $Ar^1$ in Formula I, Ia, Id, or Ie is $C_{6-10}$ aryl substituted with from 0 to 3 moieties selected from the group consisting of $C_{1-8}$ alkyl, halo, hydroxyl, and $C_{1-8}$ haloalkyl.

In some embodiments of Formula I, Ia, or Id, $R^{1a}$ is —$NR^a$—C(O)—$X^1$—O—$Ar^1$; $R^a$ is H; $X^1$ is $C_{1-2}$ alkylene substituted with 0 or 1 halo moieties; and $Ar^1$ is naphthyl substituted with from 0 to 3 moieties selected from the group consisting of $C_{1-8}$ alkyl and halo.

In some embodiments, $R^2$ in Formula I, Ia, Ib, or Ic is selected from the group consisting of —$NR^b$—$X^2$—$NR^cR^d$, —O—$X^2$—$NR^cR^d$.

In some embodiments, $R^2$ in Formula I, Ia, Ib, or Ic is —$NR^b$—$X^2$—$NR^cR^d$.

In some embodiments, $R^b$ in Formula I, Ia, Ib, or Ic is H or $C_{1-8}$ alkyl.

In some embodiments, $X^2$ in Formula I, Ia, Ib, or Ic is $C_{1-4}$ alkylene substituted with from 0 to 2 moieties selected from the group consisting of halo and hydroxyl.

In some embodiments, $R^c$ and $R^d$ in Formula I, Ia, Ib, or Ic is H, $C_{1-8}$ alkyl, and $C_{1-8}$ hydroxyalkyl.

In some embodiments of Formula I, Ia, Ib, or Ic, $R^2$ is —$NR^b$—$X^2$—$NR^cR^d$; $R^b$ is H; $X^2$ is $C_{2-3}$ alkylene substituted with 0 or 1 moieties selected from the group consisting of halo and hydroxyl; $R^c$ and $R^d$ are independently selected from the group consisting of H, $C_{1-4}$ alkyl, and $C_{1-4}$ hydroxyalkyl.

In some embodiments, $R^2$ in Formula I, Ia, Ib, or Ic is selected from the group consisting of:

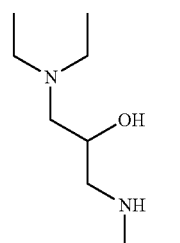

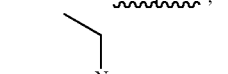

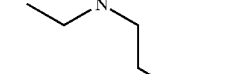

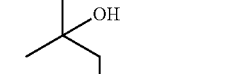

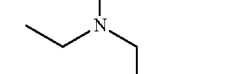

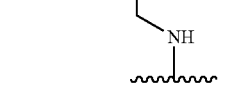

, and

wherein the wavy line indicates the point of attachment to the remainder of the molecule.

In some embodiments, in Formula I or Ia the subscript m is 0 and $R^{1a}$ and $R^{1b}$ do not combine to form an oxo or thioxo moiety.

In some embodiments, $R^3$ in Formula I, Ia, or Ib is halo or $C_{1-4}$ alkyl.

In some embodiments, $R^3$ in Formula I, Ia, or Ib is $C_{1-4}$ alkyl.

In some embodiments, the subscript n in Formula I or Ia is 1.

In some embodiments, the subscript n in Formula I or Ia is 0.

In some embodiments, the subscript q in Formula I is 0.

In embodiments, the compounds of Formula I are selected from Table 1.

TABLE 1

Representative Compounds of Formula I and IC$_{50}$ (micromolar, uM) of binding in dose-response fluorescence polarization (FP) assay.

| Compound No. | IC$_{50}$ in FP Assay (uM) | Structure |
|---|---|---|
| 1.001 NSC-15508 | 49.1 | |
| 1.002 NSC-20530 | 70.1 | |
| 1.003 NSC-15792 | 103 | |
| 1.004 NSC-14574 | 300 | |

TABLE 1-continued

Representative Compounds of Formula I and IC$_{50}$ (micromolar, uM) of binding in dose-response fluorescence polarization (FP) assay.

| Compound No. | IC$_{50}$ in FP Assay (uM) | Structure |
|---|---|---|
| 1.005 NSC-15796 | 333 | |
| 1.006 NSC-400681 | 48.5 | |

Definitions

"Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc. Alkyl groups can be substituted or unsubstituted.

"Alkylene" refers to a straight or branched, saturated, aliphatic radical having the number of carbon atoms indicated, and linking at least two other groups, i.e., a divalent hydrocarbon radical. The two moieties linked to the alkylene can be linked to the same atom or different atoms of the alkylene group. For instance, a straight chain alkylene can be the bivalent radical of —(CH$_2$)$_n$—, where n is 1, 2, 3, 4, 5 or 6. Representative alkylene groups include, but are not limited to, methylene, ethylene, propylene, isopropylene, butylene, isobutylene, sec-butylene, pentylene and hexylene. Alkylene groups can be substituted or unsubstituted.

"Alkoxy" refers to an alkyl group having an oxygen atom that connects the alkyl group to the point of attachment: alkyl-O—. As for alkyl group, alkoxy groups can have any suitable number of carbon atoms, such as $C_{1-6}$. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. Alkoxy groups can be substituted or unsubstituted.

"Hydroxyalkyl" refers to an alkyl group, as defined above, where at least one of the hydrogen atoms is replaced with one or more hydroxy group. As for the alkyl group, hydroxyalkyl groups can have any suitable number of carbon atoms, such as $C_{1-8}$. Exemplary hydroxyalkyl groups include, but are not limited to, hydroxy-methyl, hydroxy-ethyl (where the hydroxy is in the 1- or 2-position), hydroxy-propyl (where the hydroxy is in the 1-, 2- or 3-position), 2,3-dihydroxypropyl, hydroxybutyl (where the hydroxy is in the 1-, 2-, 3- or 4-position), hydroxypentyl (where the hydroxy is in the 1-, 2-, 3-, 4- or 5-position), hydroxyhexyl (where the hydroxy is in the 1-, 2-, 3-, 4-, 5- or 6-position), 1,2-dihydroxyethyl, and the like.

"Haloalkyl" refers to alkyl, as defined above, where one, some, or all of the hydrogen atoms are replaced with halogen atoms. As for alkyl group, haloalkyl groups can have any suitable number of carbon atoms, such as $C_{1-8}$. For example, haloalkyl includes trifluoromethyl, fluoromethyl, etc.

"Halogen" or "halo" refers to fluorine, chlorine, bromine and iodine.

"Oxo" refers to an oxygen atom connected to the point of attachment by a double bond (=O).

"Thioxo" refers to a sulfur atom connected to the point of attachment by a double bond (=S).

Compositions

In embodiments, the disclosure provides a pharmaceutical composition comprising compound of Formula I, or a derivative thereof, and one or more excipients or carriers, preferably pharmaceutically acceptable excipients or carriers.

As used herein, the phrase "pharmaceutically acceptable" refers to those compounds, materials, compositions, carriers, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. Excipients for preparing a pharmaceutical composition are generally those that are known to be safe and non-toxic when administered to a human or animal body. Examples of pharmaceutically acceptable excipients include, without limitation, sterile liquids, water, buffered saline, ethanol, polyol (for example, glycerol, propylene glycol, liquid polyethylene glycol and the like), oils, detergents, suspending agents, carbohydrates (e.g., glucose, lactose, sucrose or dextran), antioxidants (e.g., ascorbic acid or glutathione), chelating agents, low molecular weight proteins, and suitable mixtures of any of the foregoing. The particular excipients utilized in a composition will depend upon various factors, including chemical stability and solubility of the compound being formulated and the intended route of administration.

A pharmaceutical composition can be provided in bulk or unit dosage form. It is especially advantageous to formulate pharmaceutical compositions in unit dosage form for ease of administration and uniformity of dosage. The term "unit dosage form" refers to physically discrete units suited as unitary dosages for the subject to be treated; each unit containing a predetermined quantity of an active compound calculated to produce the desired therapeutic effect in association with the required pharmaceutical carrier. A unit dosage form can be an ampoule, a vial, a suppository, a dragee, a tablet, a capsule, an IV bag, or a single pump on an aerosol inhaler.

In therapeutic applications, dose may vary depending on the chemical and physical properties of the active compound as well as clinical characteristics of the subject, including e.g., age, weight, and co-morbidities. Generally, the dose should be a therapeutically effective amount. An effective amount of a pharmaceutical composition is that which provides an objectively identifiable improvement as noted by the clinician or other qualified observer. For example, alleviating a symptom of a disorder, disease or condition.

A pharmaceutical compositions may take any suitable form (e.g. liquids, aerosols, solutions, inhalants, mists, sprays; or solids, powders, ointments, pastes, creams, lotions, gels, patches and the like) for administration by any desired route (e.g. pulmonary, inhalation, intranasal, oral, buccal, sublingual, parenteral, subcutaneous, intravenous, intramuscular, intraperitoneal, intrapleural, intrathecal, transdermal, transmucosal, rectal, and the like). In embodiments, the pharmaceutical composition is in the form of an orally acceptable dosage form including, but not limited to, capsules, tablets, buccal forms, troches, lozenges, and oral liquids in the form of emulsions, aqueous suspensions, dispersions or solutions. Capsules may contain excipients such as inert fillers and/or diluents including starches (e.g., corn, potato or tapioca starch), sugars, artificial sweetening agents, powdered celluloses, such as crystalline and microcrystalline celluloses, flours, gelatins, gums, etc. In the case of tablets for oral use, carriers which are commonly used include lactose and corn starch. Lubricating agents, such as magnesium stearate, can also be added.

In embodiments, the pharmaceutical composition is in the form of a tablet. The tablet can comprise a unit dose of a compound described here together with an inert diluent or carrier such as a sugar or sugar alcohol, for example lactose, sucrose, sorbitol or mannitol. The tablet can further comprise a non-sugar derived diluent such as sodium carbonate, calcium phosphate, calcium carbonate, or a cellulose or derivative thereof such as methyl cellulose, ethyl cellulose, hydroxypropyl methyl cellulose, and starches such as corn starch. The tablet can further comprise binding and granulating agents such as polyvinylpyrrolidone, disintegrants (e.g. swellable crosslinked polymers such as crosslinked carboxymethylcellulose), lubricating agents (e.g. stearates), preservatives (e.g. parabens), antioxidants (e.g. butylated hydroxytoluene), buffering agents (e.g. phosphate or citrate buffers), and effervescent agents such as citrate/bicarbonate mixtures. The tablet may be a coated tablet. The coating can be a protective film coating (e.g. a wax or varnish) or a coating designed to control the release of the active compound, for example a delayed release (release of the active after a predetermined lag time following ingestion) or release at a particular location in the gastrointestinal tract. The latter can be achieved, for example, using enteric film coatings such as those sold under the brand name Eudragit®.

Tablet formulations may be made by conventional compression, wet granulation or dry granulation methods and utilize pharmaceutically acceptable diluents, binding agents, lubricants, disintegrants, surface modifying agents (including surfactants), suspending or stabilizing agents, including, but not limited to, magnesium stearate, stearic acid, talc, sodium lauryl sulfate, microcrystalline cellulose, carboxymethylcellulose calcium, polyvinylpyrrolidone, gelatin, alginic acid, acacia gum, xanthan gum, sodium citrate, complex silicates, calcium carbonate, glycine, dextrin, sucrose, sorbitol, dicalcium phosphate, calcium sulfate, lactose, kaolin, mannitol, sodium chloride, talc, dry starches and powdered sugar. Preferred surface modifying agents include nonionic and anionic surface modifying agents. Representative examples of surface modifying agents include, but are not limited to, poloxamer 188, benzalkonium chloride, calcium stearate, cetostearyl alcohol, cetomacrogol emulsifying wax, sorbitan esters, colloidal silicon dioxide, phosphates, sodium dodecyl sulfate, magnesium aluminum silicate, and triethanolamine.

In embodiments, the pharmaceutical composition is in the form of a hard or soft gelatin capsule. In accordance with this formulation, the compound of the present invention may be in a solid, semi-solid, or liquid form.

In embodiments, the pharmaceutical composition is in the form of a sterile aqueous solution or dispersion suitable for parenteral administration. The term parenteral as used herein includes subcutaneous, intracutaneous, intravenous, intramuscular, intra-articular, intraarterial, intrasynovial, intrasternal, intrathecal, intralesional and intracranial injection or infusion techniques.

In embodiments, the pharmaceutical composition is in the form of a sterile aqueous solution or dispersion suitable for administration by either direct injection or by addition to sterile infusion fluids for intravenous infusion, and comprises a solvent or dispersion medium containing, water, ethanol, a polyol (e.g., glycerol, propylene glycol and liquid polyethylene glycol), suitable mixtures thereof, or one or more vegetable oils. Solutions or suspensions can be prepared in water with the aid of co-solvent or a surfactant. Examples of suitable surfactants include polyethylene glycol (PEG)-fatty acids and PEG-fatty acid mono and diesters, PEG glycerol esters, alcohol-oil transesterification products, polyglyceryl fatty acids, propylene glycol fatty acid esters, sterol and sterol derivatives, polyethylene glycol sorbitan fatty acid esters, polyethylene glycol alkyl ethers, sugar and its derivatives, polyethylene glycol alkyl phenols, polyoxyethylene-polyoxypropylene (POE-POP) block copolymers, sorbitan fatty acid esters, ionic surfactants, fat-soluble vitamins and their salts, water-soluble vitamins and their amphiphilic derivatives, amino acids and their salts, and organic acids and their esters and anhydrides. Dispersions can also be prepared, for example, in glycerol, liquid polyethylene glycols and mixtures of the same in oils.

In embodiments, a compound or composition described here may be administered as monotherapy or adjunctive therapy. In embodiments, a compound or composition described here may be administered alone or in combination with one or more additional therapeutic agents (i.e., additional APIs) or therapies, for example as part of a therapeutic regimen that includes, e.g., aspects of diet and exercise). In embodiments, the methods described here include administration of compound of Formula I, or a derivative thereof, as the primary therapy. In other embodiments, the administration of compound of Formula I, or a derivative thereof, is an adjuvant therapy. In either case, the methods of the invention contemplate the administration of compound of Formula I, or a derivative thereof, in combination with one or more additional therapeutic agents and/or therapies for the treatment or prevention of a disease, disorder, or condition as described here. The terms "therapy" and "therapies" refer to any method, protocol and/or agent that can be used in the prevention, treatment, management or amelioration of a disease, disorder, or condition, one or more symptoms thereof.

The present disclosure also provides packaging and kits comprising pharmaceutical compositions for use in the methods described here. The kit can comprise one or more containers selected from the group consisting of a bottle, a vial, an ampoule, a blister pack, and a syringe. The kit can further include one or more of instructions for use, one or more syringes, one or more applicators, or a sterile solution suitable for reconstituting a compound or composition described here.

EXAMPLES

Thermal shift assays and fluorescence polarization competition assays were used to identify compounds that bind to BCL2A1/BFL1. Compounds were first tested for binding to BCL2A1 using differential scanning fluorimetry (DSF) thermal shift assays. DSF measures the midpoint temperature ($T_m$) for thermal denaturation of proteins; typically ligand binding stabilizes the protein fold, resulting in an increased $T_m$. During DSF experiments, all compounds that contributed to an increase in $T_m$ that corresponded to at least three standard deviations from the mean were included in further assays. Additionally, any compounds that showed a decrease in polarization of three or more standard deviations from the mean and those that were derived from early compounds with measurable IC50 values were included for further dose response studies.

DSF experiments resulted in compounds with positive $T_m$ shifts and compounds with negative $T_m$ shifts, while a number of compounds exhibited fluorescent quenching or autofluorescence, obfuscating some of the data. Thus, while DSF provided a good base for removing a number of compounds that showed no evidence of binding to BCL2A1, the number of compounds with fluorescence issues such as quenching necessitated the addition of a further screening assay in the form of a single high-dose fluorescence polarization (FP) assay. These assays were carried out using fluorescently labeled NOXA peptide which binds within the BH3-binding groove. The FP assay measures the tumbling rate of the labeled NOXA peptide as a proxy for inhibition of BH3 binding using a competition-based approach. When NOXA is bound to BCL2A1, its rate of tumbling is low (and FP is high), whereas an effective inhibitor compound will displace NOXA, causing a fast rate of tumbling (and low FP value). The initial single high dose assay was performed with each compound using 100 of compound with BCL2A1 and FITC-NOXA, to observe the relative inhibition of the BCL2A1-NOXA interaction. Small molecules that deviated by three or more standard deviations from the control mean towards inhibition of binding were selected for further analysis. These compounds and any that were three standard deviations or more above the thermal shift controls in the DSF assays were tested in an FP dose-response experiment. FIG. 1A-1F shows the FP dose response curves for each of the compounds designated Compound 1.001-1.006 (NSC-15508, NSC-20530, NSC-15792, NSC-14574, NSC-15796, and NSC-400681, respectively) in the FP assay. The IC50 values for each compound in the dose response FP assay are given in Table 1 above. The average thermal shift (Tm shift) in the DSF assay, along with the percentage of bound Noxa peptide from the single high dose FP assay are given below in Table 2 for each of these compounds. The first two compounds in Table 2 are reference compounds.

TABLE 2

Differential scanning fluorimetry (DSF) and high-dose FP Assay Results

| Compound | Average Tm Shift (° C.) | % Bound Noxa (from high-dose FP) |
| --- | --- | --- |
| REF 1 NSC-65847 | 1.92 | −6.62 |
| REF 2 NSC-97318 | −30.75 | 1.2 |
| 1.007 NSC-15508 | 0.49 | 41.48 |
| 1.008 NSC-20530 | 38.82 | 4.5 |
| 1.009 NSC-15792 | −1.43 | 51.13 |
| 1.010 NSC-14574 | −0.6 | 111.58 |
| 1.011 NSC-15796 | −0.85 | 100.64 |
| 1.012 NSC-400681 | 19.25 | 70.39 |

We further tested the biological activity of the compounds using an in vitro apoptosis assay. Primary murine splenocyte cells were used as the model system. Single cell suspensions were generated from the spleens of either wild-type (WT) mice or mice having a genetic "knock-out" of the Bax and Bak genes, resulting in Bax/Bak deficient mice (Bax/Bak KO) which lack the core machinery of the intrinsic apoptotic pathway. Mice deficient in Bax/Bak are unable to undergo intrinsic apoptosis due to the lack of the pro-apoptotic Bax and Bak proteins in the pathway. Thus, cell death in the Bax/Bak$^{-/-}$ mice suggests cytotoxicity as opposed to apoptosis via the specific inhibition of BCL2A1.

Purified cells were cultured on anti-CD3 coated (3 µg/mL, coated overnight, Biolegend, San Diego, CA) six-well plates in the presence of soluble anti-CD28 (2 µg/mL, Bio X Cell, West Lebanon, NH) and IL-2 (10 ng/mL, R&D Systems, Inc., Minneapolis, MN) in RPMI media (Life Technologies, Carlsbad, CA) for 24 hours at 37° C. Cells were then washed and cultured again in IL-2 (10 ng/mL) for 24 hours at 37° C. Cells were harvested and cultured for 24 hours on anti-CD3 coated 96-well plates at 500,000 cells per well with 2 µg/mL soluble anti-CD28, 10 ng/mL IL-2, 0.125 µg purified anti-mouse FasL (Biolegend, San Diego, CA), and varying concentrations of inhibitor compounds. Cells were then harvested and live and dead cells enumerated by trypan blue staining using the TC20 automated cell counter (Bio-Rad Laboratories, Des Plaines, IL).

FIG. 2 shows the results for Compound 1.001 in this assay. Wild-type activated primary murine T cells undergo apoptosis upon addition of Compound 1.001 with an EC50 of about 3 µM (circles). In contrast, the T cells from the Bax/Bak-deficient mice (triangles) show an EC50 about 10-fold higher (about 20-30 µM) than the wild-type cells. The higher EC50 for the Bax/Bak-deficient cells indicates that Compound 1.001 has reasonable specificity for Bcl2A1, or at least for a closely related Bcl2 family member. The gray box illustrates the therapeutic window for this compound.

Thermal Shift Assay

100 µM of each compound was applied to purified A1 at 4.4 µM in triplicate. Sypro Orange dye was added at a final dilution of 1:1000 to protein- and compound-containing wells. An Applied Biosystems StepOnePlus was used to perform Differential Scanning Fluorimetry (DSF) by elevating the temperature from 20° C. to 99° C. and measuring fluorescence at every half degree C. Melting temperature was recorded as the maximum of the first derivative, indicating half of the protein population was unfolded. Compounds that were observed to have a positive change in $T_m$ compared to the control of greater than three standard deviations were included for future assays.

Fluorescence Polarization Assay

Compounds were additionally tested for specificity of binding by displacement of FITC-labeled mouse NOXA (mNoxa; Peptide 2.0) peptide via fluorescence polarization assay (FP). FP assays were performed in two steps: single-point high-concentration compounds and dose response of fluorescence polarization hits. A1 was added at 3 µM to 100 µM of each compound in 20 mM Tris pH 7, 500 mM NaCl, 0.005% Tween-20 buffer. After addition of 375 nM labeled mNOXA, 96-well plates were incubated overnight at 20° C. in the dark to achieve equilibrium before fluorescence polarization was measured with a Biotek Synergy H2. Autofluorescent compounds and fluorescent quenching compounds were corrected via ratiometric correction as described by Shapiro et al., 2009. Any compounds that showed a significant shift in polarization, along with those identified in the thermal shift assays had a dose response measured via FP.

Dose response curves were measured by adding 3 µM A1 to a serial two-fold dilution series of each compound ranging from 400 µM to 781 nM in 20 mM Tris pH 7, 500 mM NaCl, 0.005% Tween-20 buffer. Some compounds were further tested to assess the accuracy of these two-fold dilutions with serial 1.33-fold dilutions. A1, compounds, buffer and lastly, 375 nM FITC-labeled mNOXA were added to each well and incubated in the dark at 20° C. overnight to achieve equilibrium, followed by measurement of polarization. All dose responses were performed in triplicate.

What is claimed is:

1. A method for treating chorioamnionitis in a subject in need of such treatment, the method comprising administering to the subject compound 1.001:

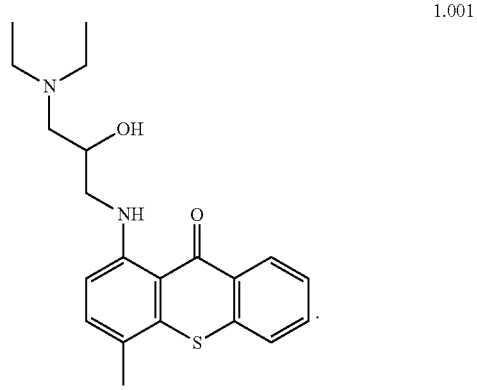 [SMILES: CCN(CC)CC(O)CNc1ccc(C)c2sc3ccccc3c(=O)c12]

2. The method of claim 1, wherein the compound is encapsulated in a liposome-based nanoparticle comprising a targeting moiety.

3. The method of claim 2, wherein the targeting moiety is a polypeptide or an antibody, or antigen-binding fragment thereof, that binds to a neutrophil-specific cell surface glycoprotein.

4. The method of claim 3, wherein the neutrophil-specific cell surface glycoprotein is CD177, CD66b, SIRPa, or SIGLEC9.

5. The method of claim 1, wherein the subject is a human subject.

6. The method of claim 5, wherein the compound is encapsulated within a liposome-based nanoparticle comprising a targeting moiety.

7. The method of claim 6, wherein the targeting moiety is a polypeptide or an antibody, or antigen-binding fragment thereof, that binds to a neutrophil-specific cell surface glycoprotein.

8. The method of claim 7, wherein the neutrophil-specific cell surface glycoprotein is CD177, CD66b, SIRPa, or SIGLEC9.

9. A method for treating a cancer in a human subject, wherein the cancer overexpresses BFL1 and is selected from the group consisting of adrenocortical carcinoma (ACC), acute myeloid leukemia (AML), bladder cancer, breast cancer, cervical cancer, cholangiocarcinoma, colorectal cancer, diffuse large B-cell (DLBC) lymphoma, glioblastoma multiforme (GBM), glioma, head and neck cancer, liver cancer, lung cancer, mesothelioma, ovarian cancer, pheochromocytoma and paraganglioma (PCPG), pancreatic cancer, prostate cancer, sarcoma, testicular germ cell cancer, thymoma, thyroid cancer, uterine cancer, clear cell renal cell carcinoma (ccRCC), chromophobe renal cell carcinoma (chRCC), and papillary renal cell carcinoma (pRCC), or attenuating an immune response in a subject in need of such treatment, the method comprising administering to the human subject compound 1.001:

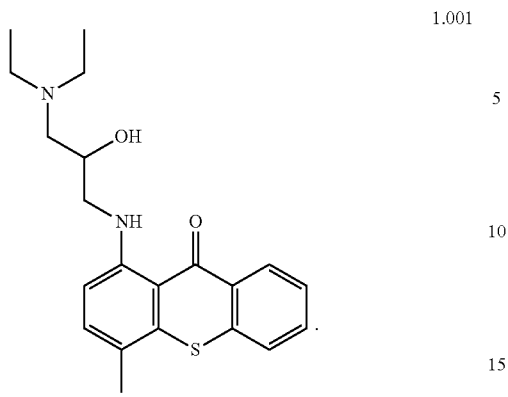

1.001

10. The method of claim 9, wherein the compound is encapsulated within a liposome-based nanoparticle comprising a targeting moiety.

11. The method of claim 10, wherein the targeting moiety is a polypeptide or an antibody, or antigen-binding fragment thereof, that binds to a neutrophil-specific cell surface glycoprotein.

12. The method of claim 11, wherein the neutrophil-specific cell surface glycoprotein is CD177, CD66b, SIRPa, or SIGLEC9.

* * * * *